United States Patent [19]

Aiba

[11] 4,210,919
[45] Jul. 1, 1980

[54] INK JET SYSTEM PRINTER INCLUDING PLURAL INK DROPLET ISSUANCE UNITS FOR ONE COLUMN PRINTING

[75] Inventor: Masahiko Aiba, Nara, Japan

[73] Assignee: Sharp Kabushiki Kaisha, Osaka, Japan

[21] Appl. No.: 886,597

[22] Filed: Mar. 14, 1978

[30] Foreign Application Priority Data

Mar. 14, 1977 [JP] Japan .................................. 52-28197
May 20, 1977 [JP] Japan .................................. 52-59215

[51] Int. Cl.² ............................................. G01D 15/18
[52] U.S. Cl. .................................. 346/75; 346/140 R
[58] Field of Search ............................. 346/75, 140 R

[56] References Cited

U.S. PATENT DOCUMENTS

| | | | |
|---|---|---|---|
| 2,997,358 | 8/1961 | Lefebvre | 346/140 UX |
| 3,373,437 | 3/1968 | Sweet et al. | 346/75 |
| 3,864,696 | 2/1975 | Fischbeck | 346/140 |
| 4,014,029 | 3/1977 | Lane et al. | 346/75 X |
| 4,025,925 | 5/1977 | Jensen et al. | 346/75 |
| 4,091,390 | 5/1978 | Smith et al. | 346/75 |

FOREIGN PATENT DOCUMENTS 2532037  1/1976  Fed. Rep. of Germany ...... 346/140 R

*Primary Examiner*—George H. Miller, Jr.
*Attorney, Agent, or Firm*—Birch, Stewart, Kolasch and Birch

[57] ABSTRACT

A plurality of ink droplet issuance units are provided for emitting plural streams of ink droplets toward a record receiving paper. The ink droplets in the respective streams are charged by a bi-valued signal through the use of a plurality of charging means in accordance with print information. The ink droplets charged by one value of the bi-valued signal are deflected as they pass through a deflection means and deposited on the record receiving paper. The ink droplets charged by the other value of the bi-valued signal are directed to a beam gutter and not deposited on the record receiving paper. In this way, one column of a dot matrix pattern is printed at a time utilizing plural streams of ink droplets.

9 Claims, 10 Drawing Figures

INK JET SYSTEM PRINTER INCLUDING PLURAL INK DROPLET ISSUANCE UNITS FOR ONE COLUMN PRINTING

BACKGROUND OF THE INVENTION

The present invention relates to an ink jet system printer which prints a desired pattern in a dot matrix fashion and, more particularly, to an ink jet system printer of the charge amplitude controlling type.

Generally, in an ink jet system printer of the charge amplitude controlling type, ink droplets of a uniform size are emitted from an ink droplet issuance unit at a given frequency and charged to desired amplitudes in accordance with print data. The thus charged ink droplets are deflected in accordance with the charge amplitude carried thereon as they pass through a constant high voltage field established by a deflection means and deposited at desired positions on a record receiving paper, thereby printing desired patterns in a dot matrix fashion.

More specifically, the deflection in the column direction is controlled by selecting the charge amplitude in an analog fashion, whereas the positioning in the row direction is achieved by driving a carriage to travel in the row direction at a constant speed. Therefore, the print velocity is limited to a specific value, and when the dot number for one matrix pattern is increased, the print velocity is considerably reduced because only one ink droplet issuance unit is employed in the system.

Moreover, when the matrix pattern comprises 5×7 ink droplets, the charge signal must be graded in eight levels. Therefore, the control circuit is complicated, and there is a possibility that print distortion occurs due to the charge error. Moreover, it is unavoidable that the print pattern is ultimately inclined because the carriage is driven to travel in the row direction at a constant speed even during the one column printing.

A typical ink jet system for conducting one column printing was disclosed in U.S. Pat. No. 3,373,437, entitled "FLUID DROPLET RECORDER WITH A PLURALITY OF JETS" on Mar. 12, 1968, wherein a plurality of orifices are provided in a manifold for emitting a plurality of jets. However, it is impossible to accurately control the phase of formation of the ink droplets in the respective jets in U.S. Pat. No. 3,373,437.

OBJECTS AND SUMMARY OF THE INVENTION

Accordingly, an object of the present invention is to provide an ink jet system printer for high speed printing.

Another object of the present invention is to simplify a control circuit of an ink jet system printer of the charge amplitude controlling type.

Still another object of the present invention is to enhance the print quality in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of ink droplet issuance units are mounted on a carriage for emitting plural streams of ink droplets toward a record receiving paper. Each of the ink droplet issuance units are provided with a nozzle, an electromechanical transducer for vibrating the nozzle in order to emit ink droplets of a uniform size at a given frequency, and a charge electrode for charging the ink droplets in accordance with print information using a bi-valued signal.

Ink droplets charged by one value of the bi-valued signal are deflected as they pass through a constant high voltage field established by a deflection means and deposited on the record receiving paper. Ink droplets charged by the other value of the bi-valued signal are directed toward a beam gutter and are not deposited on the record receiving paper. In this way, one column of a dot matrix pattern is printed at a time through the use of the plural streams of ink droplets.

In a preferred form, the respective ink droplet issuance units are provided with adjusting means for precisely adjusting the location and orientation of the respective ink droplet issuance units.

In another preferred form, the ink droplet issuance units are mounted on a carriage which is driven to rotate so that the ink droplets are radially emitted from the ink droplet issuance units toward a record receiving paper semicircularly positioned around the carriage. The rotation of the carriage functions to perform the positioning of the ink droplets in the row direction of a matrix pattern. In this form, the drive mechanism is simplified as compared with the system wherein the carriage is driven utilizing a reciprocating motion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
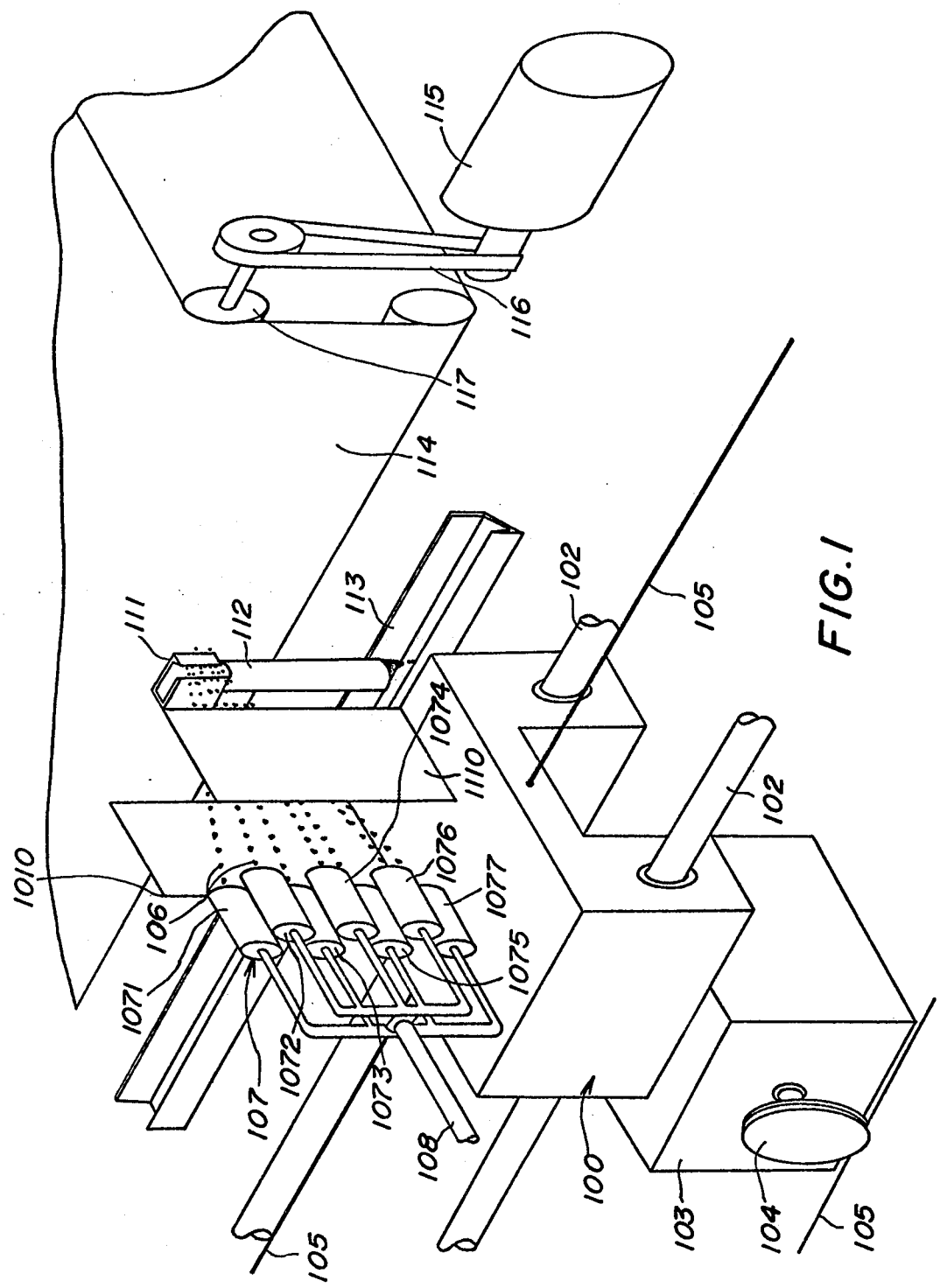
FIG. 1 is a perspective view of an embodiment of an ink jet system printer of the charge amplitude controlling type of the present invention.

FIG. 1 shows an embodiment of an ink jet system printer of the charge amplitude controlling type of the present invention, wherein a desired pattern is printed in a 5×7 matrix fashion.

A carriage 100 is slidably mounted on two parallel shafts 102. The carriage 100 is driven to reciprocate at a given speed along the shafts 102 by a servomotor 103 through a pulley 104 and a wire 105 of which the both ends are fixed to the carriage 100.

A printer head 107 including seven ink drolet issuance units 1071, 1072, 1073, 1074, 1075 1076 and 1077 is mounted on the carriage 100. Each of the ink droplet issuance units 1071–1077 emit a stream of ink droplets 106, and the number of the ink droplet issuance units 1071–1077 corresponds to the dot number in the column direction of the matrix pattern. The printer head 107 is connected to receive ink liquid under a predetermined pressure through a conduit 108.

Figure 2:
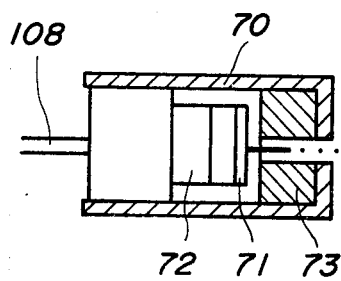
FIG. 2 is a sectional view of an ink droplet issuance unit employed in the ink jet system printer of FIG. 1.

FIG. 2 shows the ink droplet issuance unit. In FIG. 2, the ink droplet issuance unit is designated as 70.

The ink droplet issuance unit 70 comprises a nozzle 71 for issuing ink liquid, an electromechanical transducer 72 for vibrating the nozzle 71 in order to emit the ink droplets 106 of a uniform size at a given frequency, and a charging tunnel 73 for charging the ink droplet 106.

Figure 3:
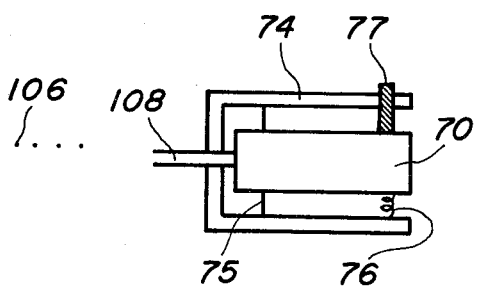
FIG. 3 is a sectional view of an ink droplet issuance unit holder employed in the ink jet system printer of FIG. 1.
Figure 4:
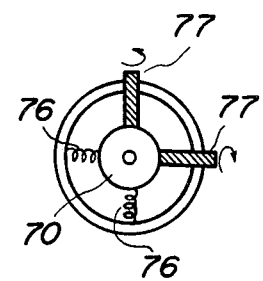
FIG. 4 is a front view of the ink droplet issuance unit holder of FIG. 3.

FIGS. 3 and 4 show a holder for accommodating the ink droplet issuance unit 70.

The ink droplet issuance unit 70 is secured within a cylindrical holder 74 through the use of a leaf spring 75. Coil springs 76 and adjusting screws 77 are provided for precisely adjusting the location and orientation of the ink droplet issuance unit 70.

The carriage 100 further supports a pair of deflection plates 1010 and 1110, a beam gutter 111, and a conduit 112. The deflection plate 1010 is maintained at the ground potential, and the deflection plate 1110 is maintained at 1 KV, thereby forming a constant high voltage field therebetween for deflecting the charged ink droplets 106 traveling therethrough. The beam gutter 111 functions to collect the ink droplets 106 not contributing to the actual writing operation, which are not charged nor deflected. The thus collected ink droplets are conducted to a tray 113 through the conduit 112 and returned to an ink liquid reservoir (not shown) for recirculation purposes.

The ink droplets 106 charged by the charging tunnel 73 are deflected by the pair of deflection plates 1010 and 1110, and directed toward a record receiving paper 114. The thus deflected ink droplets are deposited on the record receiving paper 114, whereby a desired pattern is printed on the record receiving paper 114 in a dot matrix fashion. When one line printing is completed, the record receiving paper 114 is driven to travel by one line width through the use of a pulse motor 115, a belt 116 and a paper feed roller 117.

The seven ink droplet issuance units 1071 through 1077 are aligned in such a manner that the ink droplets 106 emitted from the respective ink droplet issuance units 1071 through 1077 are aligned in a column direction, which is perpendicular to the traveling direction of the carriage 100. That is, the direction of the emitted ink droplets is precisely adjusted by the adjusting screws 77 so that the charged ink droplets 106 emitted from the ink droplet issuance units 1071 through 1077 form one column of a dot matrix pattern on the record receiving paper 114 with a height of, for example 0.42 mm. The charging tunnel 73 is connected to receive a voltage signal of about +200 V and, therefore, the ink droplets 106 bear a charge of the negative voltage. Accordingly, the charged ink droplets 106 are deflected toward the deflection plate 1110 while they pass through the constant high voltage field established between the pair of deflection plates 1010 and 1110.

Figure 5:
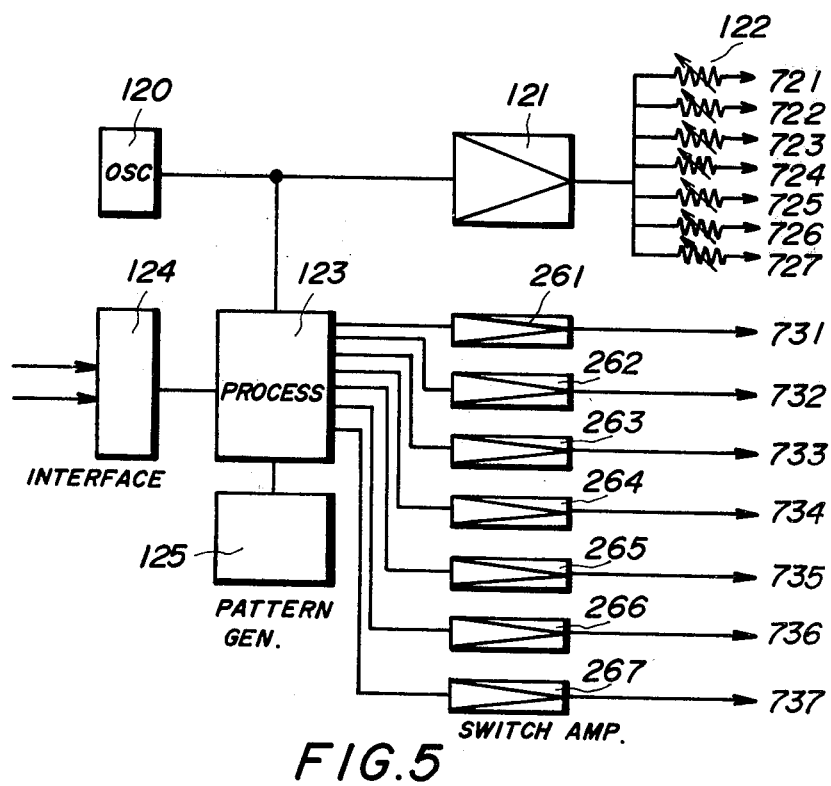
FIG. 5 is a block diagram of a control circuit of the ink jet system printer of FIG. 1.

FIG. 5 shows a control circuit of the ink jet system printer of FIG. 1.

A master oscillator circuit 120 develops a clock signal which is power amplified at an amplifier 121. The thus amplified signal is applied to electromechanical transducers 721, 722, 723, 724, 725, 726 and 727 (corresponding to the electromechanical transducer 72 of FIG. 2) of the respective ink droplet issuance units 1071 through 1077 through variable resistors 122. The thus applied signal functions to vibrate the nozzle in the respective ink droplet issuance units at a given frequency, thereby emitting the ink droplets at the given frequency. The droplet formation timing is controlled through the use of the variable resistors 122 so that the ink droplets in the respective stream are formed in a same phase.

The clock signal derived from the master oscillator circuit 120 is also applied to a digital processor unit 123 which develops a video signal to be applied to respective charging tunnels 731, 732, 733, 734, 735, 736 and 737 (corresponding to the charging tunnel 73 of FIG. 2) of the respective ink droplets issuance units 1071 through 1077. More specifically, the processor unit 123 develops the video signals corresponding to print data introduced through an interface 124. The unit 123 functions to develop the video signals which are the logical product of the clock signal and pattern data for one column of the dot matrix pattern, said pattern data being read out from a pattern generator 125 in accordance with the print data introduced into the digital processor unit 123. The thus obtained video signals are applied to the charging tunnels 731 through 737 via video switching amplifiers 261 through 267, respectively. Generation of the video signals is timed in agreement with the formation of the ink droplets 106.

Accordingly, the ink droplets in the respective streams are charged in accordance with the pattern data for one column of the dot matrix pattern corresponding to the introduced print data. The charged ink droplets are deposited on the record receiving paper 114 for printing the one column of the dot matrix pattern at a time. Although not shown in FIG. 5, the digital processor unit 123 functions to control the drive of the carriage 100 and the paper feed mechanism comprising the pulse motor 115, the belt 116 and the paper feed roller 117.

Figure 6:
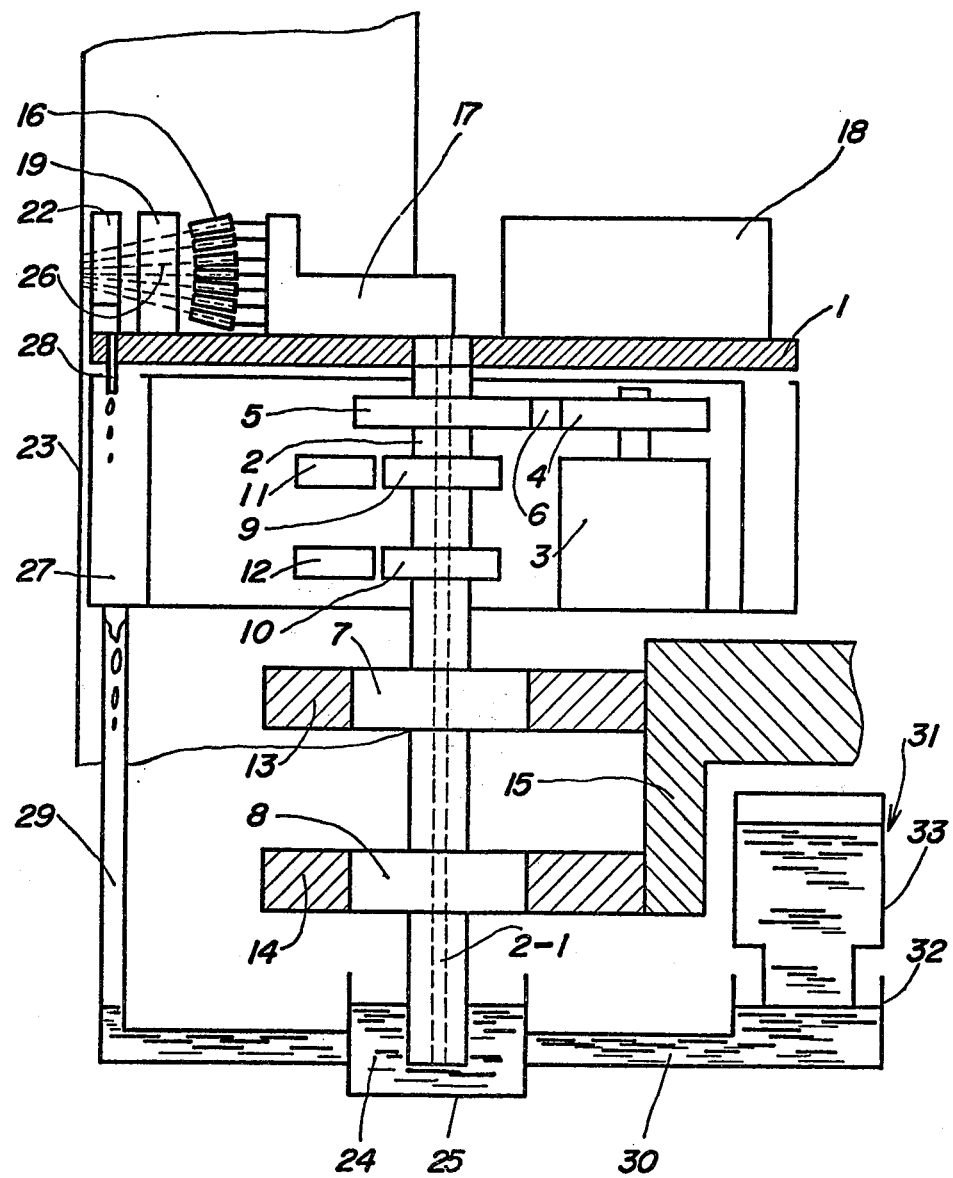
FIG. 6 is a sectional view of another embodiment of an ink jet system printer of the charge amplitude controlling type of the present invention.
Figure 7:
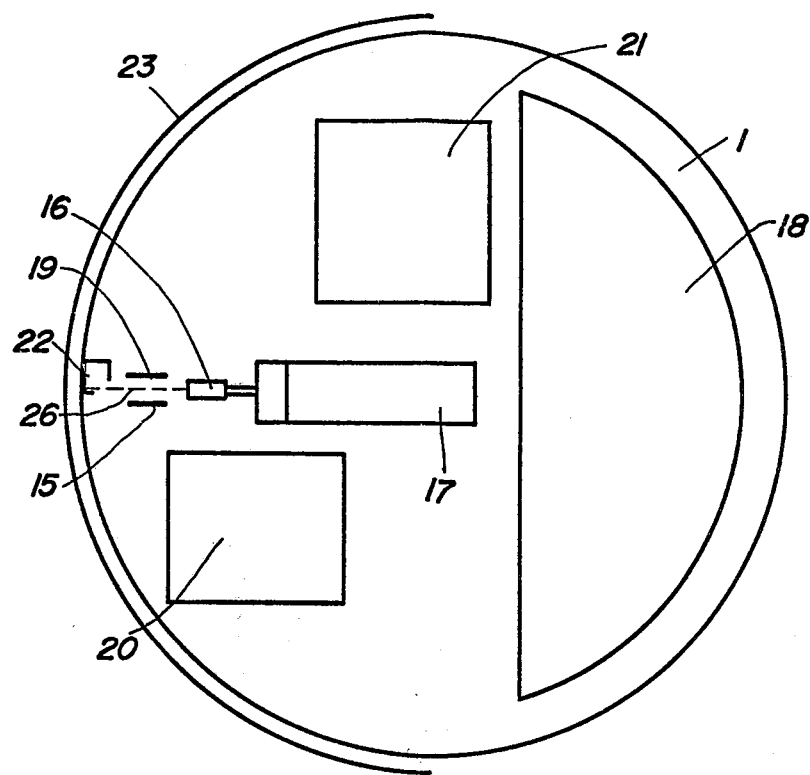
FIG. 7 is a plan view of the ink jet system printer of FIG. 6.

FIGS. 6 and 7 show another embodiment of an ink jet system printer of the charge amplitude controlling type of the present invention, wherein a desired pattern is printed in a 5×7 matrix fashion.

A circular plate 1 is mounted on a shaft 2. The circular plate 1 is driven to rotate with shaft 2 by a motor 3 through a pulley 4, a belt 6 and another pulley 5 which is secured around the shaft 2.

The shaft 2 is rotatably supported by bearings 7 and 8. Electrodes 9 and 10 are secured around the shaft 2 for electrical communication purposes between stationary electrodes 11 and 12 through the use of electrostatic induction. The electrode 9 functions to introduce print data from the stationary electrode 11 into a printer head mounted on the circular plate 1. The electrode 10 functions to develop a detection signal to the stationary electrode 12 for control purposes. The electrodes 9 and 10 are electrically connected to a data processor unit mounted on the circular plate 1 through wirings secured in the shaft 2.

The bearings 7 and 8 are secured by support arms 13 and 14 and function to supply A.C. 100 V power to electric circuits mounted on the circular plate 1. The support arms 13 and 14 are fixed to a printer body 15.

A centrifugal pressure chamber 17 for supplying ink liquid to seven ink droplet issuance units 16 under a predetermined pressure, a data processor unit 18 communicated to the electrodes 9 and 10, a pair of deflection electrodes 19, a high voltage unit 20 for supplying a high voltage to the deflection electrodes 19, a power supply circuit 21 for supplying the electric power to the data processor unit 18 and the high voltage unit 20, and a beam gutter 22 are mounted on the circular plate 1. A record receiving paper 23 is disposed around the circular plate 1 in a semicircular section fashion in order to receive charged and deflected ink droplets. The seven ink droplet issuance units 16 are aligned so that one column of the dot matrix pattern is printed at a time by the seven ink droplets emitted from the seven ink droplet issuance units 16.

The centrifugal pressure chamber 17 is communicated to an ink liquid reservoir 25, which contains ink liquid 24 therein, via a conduit 2-1 secured within the shaft 2. The centrifugal chamber 17 functions to pull up the ink liquid 24 from the ink liquid reservoir 25 and supply the ink liquid 24 to the ink droplet issuance units 16 under a predetermined pressure while the circular plate 1 rotates around the shaft 2.

Figure 8:
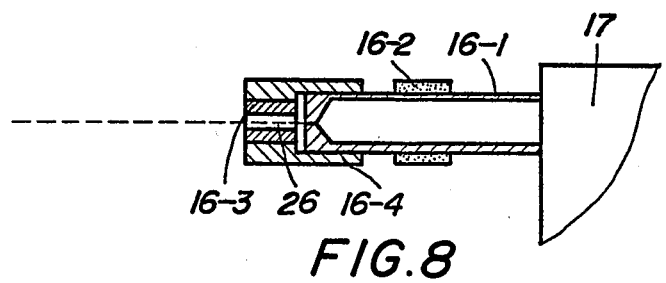
FIG. 8 is a sectional view of an ink droplet issuance unit employed in the ink jet system printer of FIG. 6.

FIG. 8 shows a construction of the ink droplet issuance unit 16.

The ink droplet issuance unit 16 comprises a nozzle pipe 16-1 which is communicated to the centrifugal pressure chamber 17 and has an orifice for emitting a stream of ink liquid, an electromechanical transducer 16-2 for vibrating the nozzle pipe 16-1 at a given frequency for providing a stream of ink droplets 26 having the given frequency, and a charging tunnel 16-3 for charging the ink droplets 26 in accordance with the print data. The charging tunnel 16-3 is supported by an insulating holder 16-4. The ultrasonic vibration signal to be applied to the electromechanical transducer 16-2, and a video signal to be applied to the charging tunnel 16-3 are derived from the data processor unit 18.

Operation of the centrifugal pressure chamber 17 will be appreciated by the following description.

The ink liquid 24 is introduced into the centrifugal pressure chamber 17 at the center of the circular plate 1. Now assume that the distance from the center of the circular plate 1 to the orifice of the nozzle pipe is r(m), the density of the ink liquid is $\rho$(kg/m$^3$), and the rotation velocity of the circular plate 1 is $\omega$(rad/s). The pressure P applied to the ink liquid at the orifice of the nozzle pipe can be calculated as follows:

$$P = \rho r^2 \omega^2 / 19.6$$

In a typical system, $r = 100 \times 10^{-3}$(m), $\rho \approx 10^3$ kg/m$^3$ and $\omega = 250$ rad/s ($\approx 2400$ rpm). In this case, $P \approx 31880$(kg/m$^2$) $\approx 3.2$(kg/cm$^2$). Accordingly, the above calculated pressure is sufficient for the system which includes the nozzle of which the diameter of the orifice is around 50 $\mu$m.

A circular shaped tray 27 is disposed below the periphery of the circular plate 1 for collecting the ink liquid caught by the beam gutter 22. That is, the ink liquid captured by the beam gutter 22 is conducted to the tray 27 through a conduit 28 formed through the circular plate 1. The thus collected ink liquid is returned to the ink liquid reservoir 25 through a conduit 29 for recirculation purposes. An ink liquid supply means 31 including an ink cartridge 33, an auxiliary ink liquid reservoir 32 and a conduit 30 is provided for maintaining the ink liquid 24 contained in the ink liquid reservoir 25 at a desired level.

Figure 9:
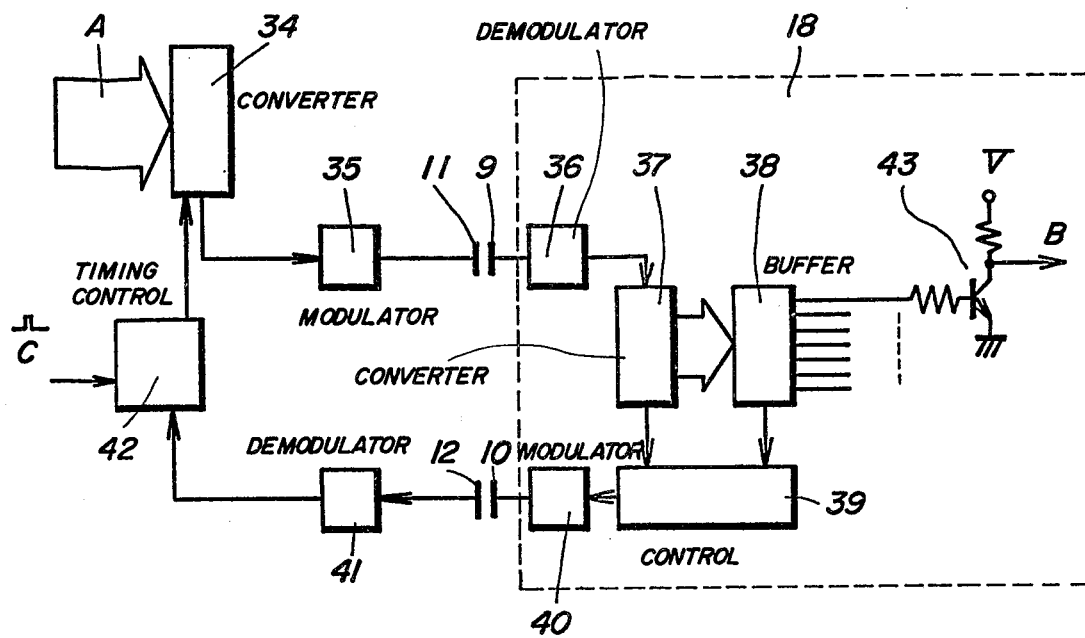
FIG. 9 is a block diagram of a control circuit of the ink jet system printer of FIG. 6.

FIG. 9 shows a control circuit of the ink jet system printer of FIGS. 6 and 7.

The circular plate 1 is driven to rotate by the motor 3. When the revolution of the circular plate 1 reaches a constant speed, a print ready signal is developed, whereby the printing is conducted when the printer head reaches a predetermined position confronting the record receiving paper 23. When the printer head reaches the above-mentioned predetermined position, the data processor unit 18 develops a control signal which is applied to the stationary electrode 12 via the electrode 10. In synchronization, with the development of the control signal, the print data is introduced into the data processor unit 18 through the electrodes 9 and 11 for developing the video signal.

More specifically, the print data A is introduced into a parallel-to-serial converter buffer register 34, of which output signals are applied to a modulator 35. Output signals of the modulator 35 are transferred to a demodulator 36 through the electrodes 11 and 9. Serial signals derived from the demodulator 36, which are identical with the serial signals developed from the parallel-to-serial converter buffer register 34, are applied to a serial-to-parallel converter buffer register 37 for obtaining the print data A. The thus introduced print data A are applied to a print buffer register 38.

When the print operation relating to the contents stored in the print buffer register 38 is completed, new data is introduced from the serial-to-parallel converter buffer register 37 into the print buffer register 38. In synchronization with the introduction of the print data into the print buffer register 38, a controller 39 developes a buffer ready signal for introducing the next print data into the serial-to-parallel converter buffer register 37. The thus generated buffer ready signal is applied to the electrode 10 via a modulator 40. The modulated signal is applied to a demodulator 41, of which an output signal is applied to a timing control circuit 42. The timing control circuit 42 is clocked by a clock signal C, and functions to apply the buffer ready signal to the parallel-to-serial converter buffer register 34. Accordingly, the parallel-to-serial converter buffer register 34 develops the next print data toward the serial-to-parallel converter buffer register 37.

The contents stored in the print buffer register 38 are developed by seven bits, and the respective outputs are applied to a base electrode of a transistor 43 through a resistor. The emitter of the transistor 43 is grounded, and the collector of the transistor 43 is connected to an output terminal for developing a video signal B. The collector of the transistor 43 is connected to a voltage source V of 10–300 V which is required for the video signal B.

When the output of the print buffer register 38 is the low level, the transistor 43 is OFF and, hence, the voltage V is applied to the charging tunnel as the video signal B. When the output of the print buffer register 38 is the high level, the transistor 43 is ON and, hence, the video signal B of the level V is not applied to the charging tunnel.

Figure 10:
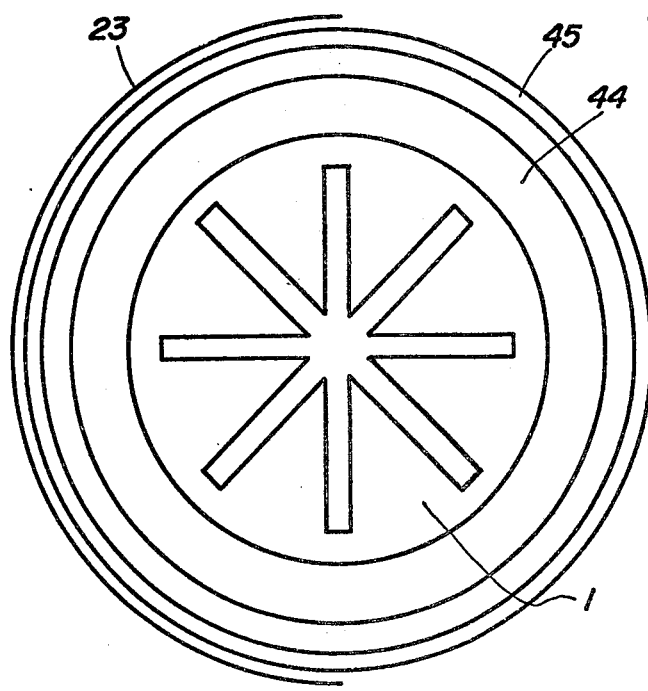
FIG. 10 is a plan view of still another embodiment of an ink jet system printer of the charge amplitude controlling type of the present invention.

FIG. 10 shows still another embodiment of an ink jet system printer of the present invention, wherein eight ink droplet issuance units are radially mounted on the circular plate 1.

The respective ink droplet issuance units develop the ink droplets for the respective dot levels in the dot matrix pattern. In this example, a pair of deflection electrodes 44 are circularly provided around the ink droplet issuance units, and the deflection electrodes 44 are parallel with the circular plate 1. A beam gutter 45 is provided at the periphery of the circular plate 1 in a circular fashion.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer which emits a plurality of charged ink droplets toward a record receiving medium, deflects said charged ink droplets and deposits said deflected ink droplets on said record receiving medium, whereby a desired pattern is printed on said record receiving medium in accordance with a predetermined set of print data information in a dot matrix fashion yielding a dot matrix pattern, the improvement comprising:

a plurality of discrete ink droplet issuance units;
emitting means for emitting said plurality of ink droplets in corresponding streams from each of said ink droplet issuance units, said emitting means including adjustable means and being responsive thereto for simultaneously forming ink droplets at each of said respective ink droplet issuance units and simultaneously emitting each of said ink droplets therefrom to maintain corresponding ink droplets in said streams substantially in phase with one another;
each of said ink droplet issuance units including a charging means for selectively charging some of said plurality of ink droplets in accordance with said print data information;
said charging means charging each selected one of said plurality of ink droplets immediately upon the simultaneous and in phase formation of each of said ink droplets at each of said respective ink droplet issuance units;
a deflecting means for deflecting each of said charged ink droplets emitted from each of said ink droplet issuance units in a predetermined direction; and
a beam gutter for collecting each of said ink droplets not charged by said charging means, one column of said dot matrix pattern being printed at a time by said selectively charged plurality of ink droplets emitted from said plurality of discrete ink droplet issuance units.

2. The ink jet system printer of claim 1, wherein each of said ink droplet issuance units further comprises an adjusting means for adjusting the direction of travel of a stream of ink droplets being emitted from each of said ink droplet issuance units.

3. The ink jet system printer of claim 1, wherein said dot matrix pattern comprises a 5×7 dot matrix fashion, said plurality of discrete ink droplet issuance units constituting seven ink droplet issuance units.

4. The ink jet system printer of claim 3, wherein said seven ink droplet issuance units are aligned in a direction corresponding to one column of said dot matrix pattern.

5. The ink jet system printer of claim 1, wherein said plurality of discrete ink droplet issuance units, said deflection means and said beam gutter are mounted on a circular plate which is driven to rotate at a constant velocity.

6. The ink jet system printer of claim 5, further comprising a centrifugal pressure chamber mounted in the center of said circular plate, said ink droplet issuance units being connected to receive ink liquid supply from said centrifugal pressure chamber under a predetermined pressure, said predetermined pressure being proportional to the rotation velocity of said circular plate.

7. The ink jet system printer of claim 1, wherein each said emitting means comprises;
an electromechanical transducer means for vibrating a corresponding said ink droplet issuance unit thereby emitting ink droplets from each issuance unit at a given frequency, and responsive to said adjustable means to maintain the phase and frequency of emittance of each of said ink droplets from each of said plurality of ink droplet issuance units.

8. An ink jet system printer in accordance with claim 7, further comprising:
clock signal generator means for generating a periodic clock signal;
said emitting means comprising an amplifier means responsive to said clock signal for amplifying said clock signal; and
said adjustable means comprising a plurality of variable resistance means responsive to said amplified clock signal and connected one in series with each of said transducer means associated with each ink droplet issuance unit for applying said amplified clock signals to corresponding ones of said transducer means for maintaining substantially the same phase and frequency of emittance of corresponding ones of said plurality of ink droplets emitted from each of said plurality of ink droplet issuance units.

9. The ink jet system printer in accordance with claim 8 wherein said charging means generates a plurality of video signals in response to said clock signal, to said predetermined print data information, and to a set of pattern data corresponding to one column of said dot matrix pattern;
each of said plurality of video signals being conducted to a charging tunnel associated with each of said plurality of ink droplet issuance units thereby creating a charging potential at each of said charging tunnels associated with said plurality of ink droplet issuance units;
said charging potential being received by each of said charging tunnels substantially simultaneously with the formation of each of said ink droplets at each of said plurality of ink droplet issuance units, thereby charging each of said simultaneously formed ink droplets in accordance with said predetermined print data information and said pattern data corresponding to one column of said dot matrix pattern.

* * * * *